(12) United States Patent
Issler et al.

(10) Patent No.: US 8,500,334 B2
(45) Date of Patent: Aug. 6, 2013

(54) SLIDE BEARING

(75) Inventors: Wolfgang Issler, Schwaikheim (DE); Theo Mossmann, Schifferstadt (DE)

(73) Assignee: MAHLE International GmbH, Stuttgart (DE)

( * ) Notice: Subject to any disclaimer, the term of this patent is extended or adjusted under 35 U.S.C. 154(b) by 426 days.

(21) Appl. No.: 12/583,755

(22) Filed: Aug. 25, 2009

(65) Prior Publication Data

US 2010/0054639 A1 Mar. 4, 2010

(30) Foreign Application Priority Data

Aug. 26, 2008 (DE) .......................... 10 2008 039 740

(51) Int. Cl.
*F16C 9/02* (2006.01)
*F16C 33/10* (2006.01)

(52) U.S. Cl.
USPC .......................................... 384/294; 384/288

(58) Field of Classification Search
USPC ............................. 384/275, 286, 288, 294, 296
See application file for complete search history.

(56) References Cited

U.S. PATENT DOCUMENTS

| | | | | |
|---|---|---|---|---|
| 2,914,367 A * | 11/1959 | Underwood | .................. | 384/288 |
| 4,235,481 A * | 11/1980 | Fukuoka et al. | ............. | 384/431 |
| 5,009,522 A * | 4/1991 | Hahn | ............................. | 384/288 |
| 5,363,557 A | 11/1994 | Thompson et al. | | |
| 6,089,756 A * | 7/2000 | Ono et al. | ..................... | 384/322 |
| 6,634,791 B2 | 10/2003 | Ono et al. | | |
| 6,695,482 B2 * | 2/2004 | Niwa et al. | .................... | 384/294 |
| RE39,377 E * | 11/2006 | Kumada et al. | ............... | 384/625 |
| 7,572,060 B2 * | 8/2009 | Kuroda et al. | ................ | 384/276 |
| 7,575,814 B2 | 8/2009 | Adam et al. | | |
| 7,744,281 B2 * | 6/2010 | Fuerst et al. | ...................... | 384/8 |
| 8,167,496 B2 * | 5/2012 | Issler et al. | ..................... | 384/283 |
| 8,322,929 B2 * | 12/2012 | Issler | ............................ | 384/286 |
| 2007/0081748 A1 * | 4/2007 | Sitter | ............................ | 384/294 |

FOREIGN PATENT DOCUMENTS

| | | |
|---|---|---|
| DE | 198 18 120 | 11/1999 |
| DE | 101 56 345 | 5/2002 |
| DE | 103 37 030 | 3/2005 |
| DE | 10 2007 058 744 | 6/2009 |
| JP | 2001-182751 | 7/2001 |

* cited by examiner

*Primary Examiner* — Thomas R Hannon
*Assistant Examiner* — Adam D Rogers
(74) *Attorney, Agent, or Firm* — Collard & Roe, P.C.

(57) ABSTRACT

A slide bearing has at least one bearing shell for accommodating a component to be supported. The at least one bearing shell has a device for monitoring a bearing gap between the bearing shell and the component to be supported. The bearing shell is provided with a slide surface that has an elevation along each of its curved edge regions.

2 Claims, 2 Drawing Sheets

SLIDE BEARING

CROSS REFERENCE TO RELATED APPLICATIONS

Applicants claim priority under 35 U.S.C. §119 of German Application No. 10 2008 039 740.7 filed Aug. 26, 2008.

BACKGROUND OF THE INVENTION

1. Field of the Invention

The present invention relates to a slide bearing having at least one bearing shell for accommodating a component to be supported. The bearing shell has a device for monitoring a bearing gap between the bearing shell and the component to be supported.

2. The Prior Art

German Patent Application No. DE 198 18 120 A1 describes a crankshaft slide bearing, in which a compensation device configured at least in some sections is provided between the bearing shell and the bearing block, to equalize the operationally caused widening of the bearing gap between bearing shell and crankshaft. The compensation device has a greater heat expansion coefficient than the bearing block.

SUMMARY OF THE INVENTION

It is an object of the invention to develop a slide bearing in which good control of the lubricant flow between the slide surface and the component to be supported is achieved with the least possible effort.

This object is accomplished by a slide bearing having a bearing shell that is provided with a slide surface that has an elevation along its curved edge regions. By means of the elevations provided according to the invention, crosspiece-like structures are formed, which exert a throttling effect in such a manner that they counter the lubricant that is flowing away with an additional flow resistance. The lubricant is therefore held in the region of the bearing shell over a long period of time. The measures according to the invention can be implemented with little technical effort.

The elevation can have a thickness of 2 μm to 20 μm, preferably 3 μm to 8 μm, in order to achieve a good throttling effect with the smallest possible amount of material. The elevation can be formed by a thickened region of the slide surface along its curved edge regions. For example, the slide layer can be configured as a galvanic or sputtered coating, whereby the different layer thicknesses of the slide surface can be produced during the coating process, by means of using suitable orifices.

However, the elevation can also be formed by a corresponding contour of the slide bearing material disposed underneath the slide layer. The slide bearing material can be brought into the desired shape before application of the slide layer, for example, by means of cutting or non-cutting machining. The slide layer can then have a constant thickness.

Of course, a combination of these two measures is also possible. Further optimization can be achieved in that two bearing shells are provided and the elevations are provided in the bearing shell that is subject to less stress during operation. In this way, improved stress relief on the bearing shell that is subject to greater stress can be achieved.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
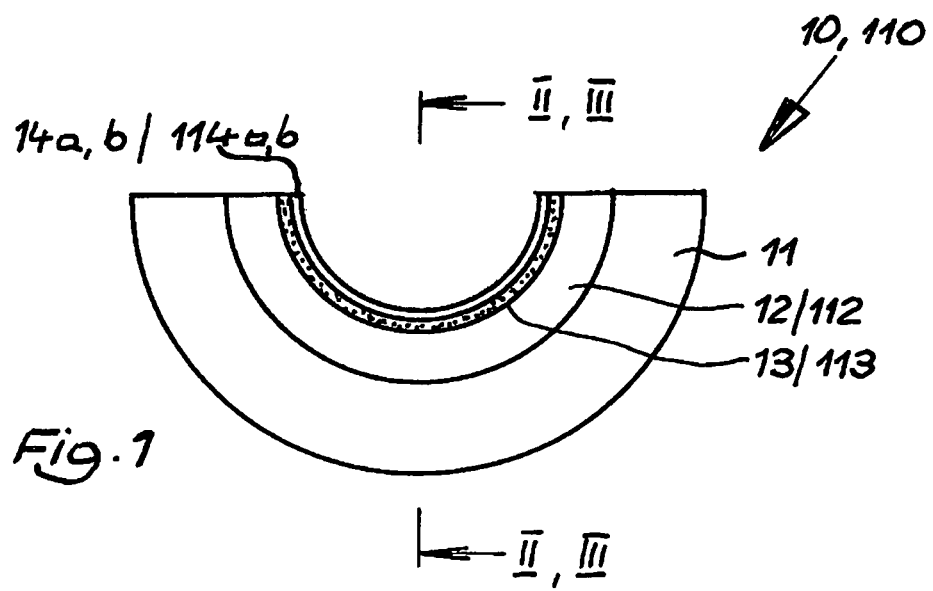
FIG. 1 shows a frontal view of a bearing shell of a slide bearing according to the invention.

Referring now in detail to the drawings, FIG. 1 shows a bearing shell 10, 110 for a slide bearing according to the invention. The structure of slide bearings is known and has been described, for example, in German Patent Application No. DE 103 37 030 A1, the disclosure of which is herein incorporated by reference. A slide bearing generally consists of a layered composite that is shown in two parts in FIGS. 1 to 3, for reasons of clarity, with a carrier layer 11 and a slide bearing material layer 12. The layer 12 is provided with a slide layer 13 in the direction of the component to be supported. A device (not shown) for monitoring the bearing gap between the slide bearing and the component to be supported is disposed on the slide bearing.

Figure 2:
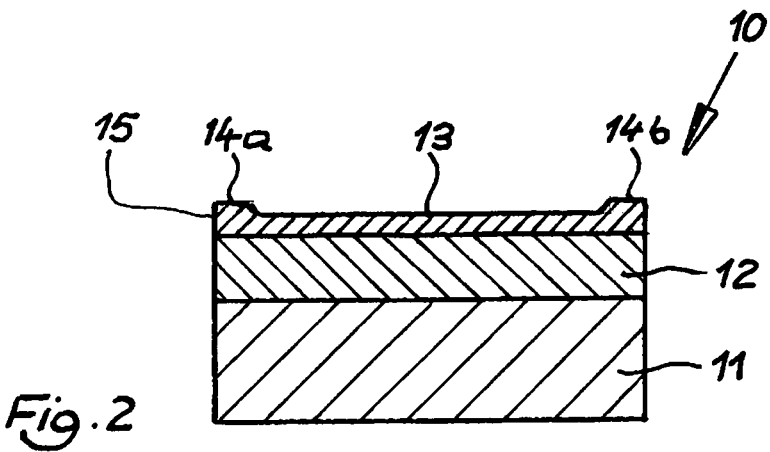
FIG. 2 shows a section along the line II-II of a first exemplary embodiment according to FIG. 1.

FIG. 2 shows a first exemplary embodiment of a bearing shell 10 for a slide bearing according to the invention. The slide layer 13 has an elevation 14a, 14b along its curved edge regions, in each instance. Each elevation has a generally rectangular cross-section. The elevations 14a, 14b can be produced, for example, in known manner, in that the slide layer is applied using suitable orifices, as a galvanic layer or sputtered layer.

Figure 4:
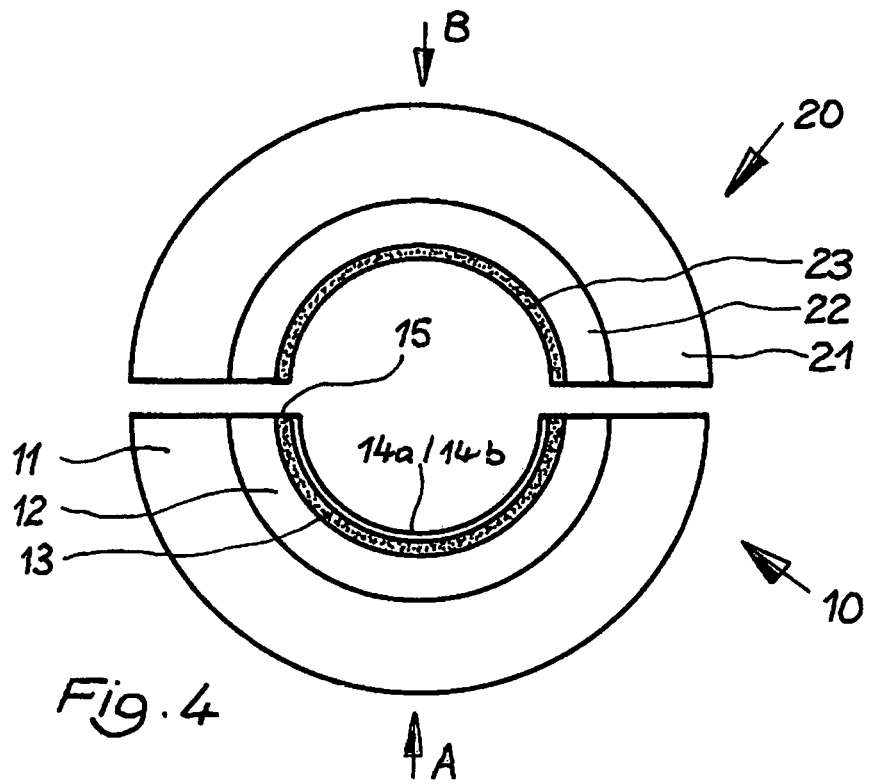
FIG. 4 shows an embodiment of the present invention with two bearing shells.
Figure 5:
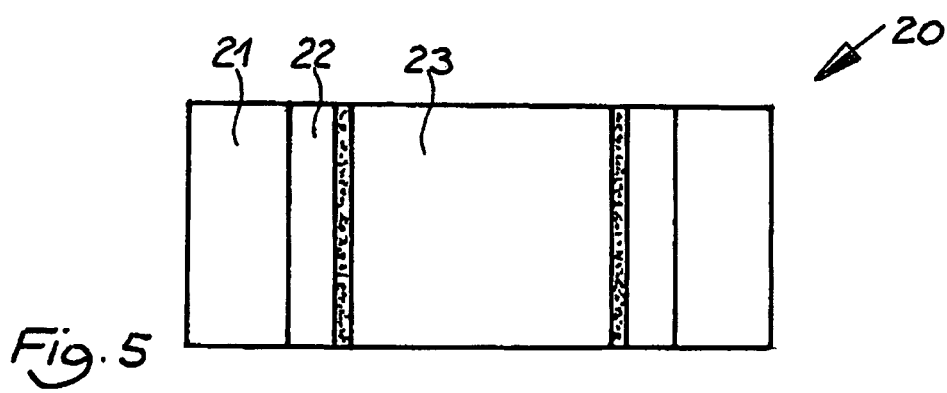
FIG. 5 shows the bearing shell 20 of FIG. 4 when viewed in the direction of arrow A.
Figure 6:
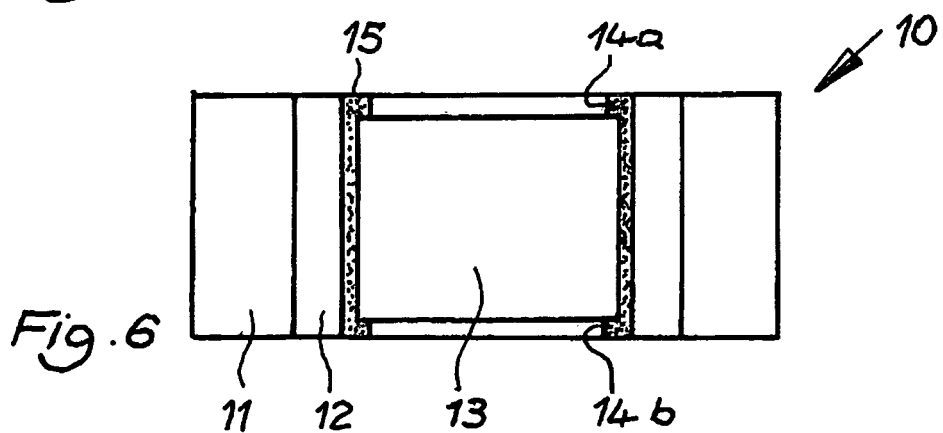
FIG. 6 shows the bearing shell 10 of FIG. 4 when viewed in the direction of arrow B.

In the embodiment shown in FIGS. 4-6, two bearing shells 10, 20 form a slide bearing for a component that is to be supported and rotates during operation, for example a crankshaft. The bearing shells 10, 20 each have a carrier layer 11, 21, a slide bearing material layer 12, 22 and a slide layer 13, 23. In this embodiment, the elevations 14a, 14b are provided in the bearing shell 10 that is subject to less stress. In this manner, improved stress relief of the bearing shell that is subject to greater stress and lies on the opposite side is achieved.

Figure 3:
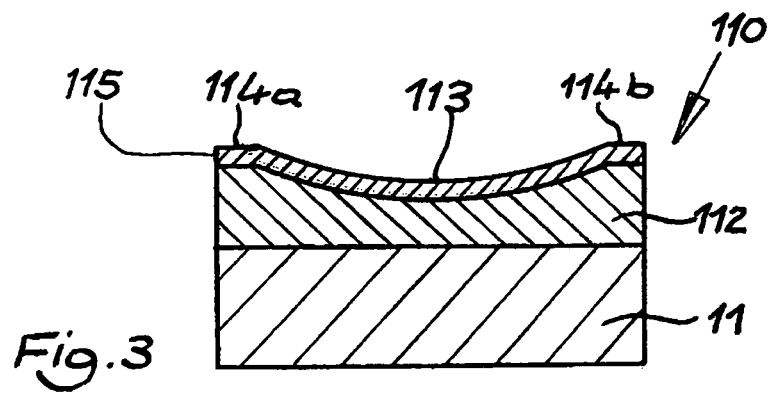
FIG. 3 shows a section along the line III-III of another exemplary embodiment according to FIG. 1.

FIG. 3 shows another embodiment of a bearing shell 110 for a slide bearing according to the invention. In this case, slide bearing material layer 112 was machined before application of slide layer 113, in cutting or non-cutting manner, in such a way that an elevation 114a, 114b was formed along each of the curved edge regions 115 of bearing shell 110. In this manner, the desired shape of the bearing shell, according to the invention, is already obtained before application of slide layer 113. The slide layer can subsequently be applied in a conventional manner, as a galvanic layer or sputtered layer, and can have a constant layer thickness. The use of orifices is possible in this case, but not necessary.

In order to improve the run-in behavior, rough structures having peaks that project at 2 μm to 8 μm can be worked into the slide layer in the region of the radial surfaces of elevations 14*a*, 14*b* and 114*a*, 114*b*, in the form of a groove or cross structure (not shown), which structures are produced by means of machining methods or by means of lasers, electron beams, or other suitable methods, such as rollers, etc.

In the exemplary embodiment, two bearing shells form a slide bearing for a component that is to be supported and rotates during operation, for example a crankshaft. In this embodiment, elevations 114*a*, 114*b* are provided in bearing shell 110 that is subject to less stress. In this manner, improved stress relief of the bearing shell that is subject to greater stress and lies on the opposite side is achieved.

Accordingly, while only a few embodiments of the present invention have been shown and described, it is obvious that many changes and modifications may be made thereunto without departing from the spirit and scope of the invention.

What is claimed is:

1. A slide bearing comprising:
   two bearing shells having curved edge regions;
   wherein one of the bearing shells is subject to less stress during operation than the other one of the bearing shells,
   wherein only the bearing shell that is subject to less stress during operation is provided with a slide layer that has a single elevation along each of the curved edge regions, respectively, each elevation having a generally rectangular cross-section; and
   wherein each elevation is formed by a thickened region of the slide layer along the curved edge regions.

2. The slide bearing according to claim 1, wherein each elevation has a radial thickness of 2 $\mu$m to 20 $\mu$m.

\* \* \* \* \*